(12) United States Patent
Dilbeck et al.

(10) Patent No.: US 10,047,002 B2
(45) Date of Patent: Aug. 14, 2018

(54) SYSTEMS AND METHODS FOR CLEANABLE AND SLIP RESISTANT TILE

(71) Applicant: MOHAWK CARPET CORPORATION, Calhoun, GA (US)

(72) Inventors: Aaron C. Dilbeck, Dallas, TX (US); David A. Earl, Corning, NY (US); Terry Adams, Dallas, TX (US); Norm Elias, Terrell, TX (US); Linda Robledo, Mesquite, TX (US)

(73) Assignee: Mohawk Carpet Company, Calhoun, GA (US)

( * ) Notice: Subject to any disclaimer, the term of this patent is extended or adjusted under 35 U.S.C. 154(b) by 353 days.

(21) Appl. No.: 14/444,316

(22) Filed: Jul. 28, 2014

(65) Prior Publication Data

US 2015/0030809 A1    Jan. 29, 2015

Related U.S. Application Data

(60) Provisional application No. 61/859,550, filed on Jul. 29, 2013.

(51) Int. Cl.
    *C03C 8/02* (2006.01)
    *B05D 3/02* (2006.01)
    (Continued)

(52) U.S. Cl.
    CPC .............. *C03C 8/02* (2013.01); *B05D 3/0254* (2013.01); *C03C 3/087* (2013.01); *C03C 8/04* (2013.01);
    (Continued)

(58) Field of Classification Search
    CPC .. C03C 8/02; C03C 8/20; C03C 3/083; B05D 3/007; B05D 3/0254; B05D 5/02;
    (Continued)

(56) References Cited

U.S. PATENT DOCUMENTS 3,885,005 A * 5/1975 Downing ................. B22F 3/222
                                                      264/125
4,080,228 A * 3/1978 Currigan ............... E01C 23/082
                                                      156/247
(Continued)

FOREIGN PATENT DOCUMENTS

WO    2005042657 A2    5/2005
WO    2007059808 A1    5/2007
(Continued)

OTHER PUBLICATIONS

Pesonen-Leinonen, Eija. "Determination of Cleanability of Plastic Surfaces" University of Helsinki. Dissertation. Oct. 28, 2005.
Extended European Search Report in related Priority Application No. EP 14178991, dated Dec. 17, 2014.

*Primary Examiner* — Megha M Gaitonde
(74) *Attorney, Agent, or Firm* — Troutman Sanders LLP; Ryan A. Schneider; Alexis N. Simpson

(57) ABSTRACT

Disclosed herein are tiles, coatings, and related methods that provide both high cleanability and high slip resistance. The coating can be a surface coating with a unique chemical make-up. The surface coating can also have particles suspended within it. During a firing process, the coating and particles can settle in such a manner that the surface structure of the coating, and thus the surface structure of the tile, is both easy to clean and slip-resistant.

17 Claims, 11 Drawing Sheets

(51) Int. Cl.
*E04C 2/02* (2006.01)
*C04B 41/86* (2006.01)
*C04B 41/89* (2006.01)
*C04B 41/00* (2006.01)
*C04B 41/50* (2006.01)
*C04B 41/52* (2006.01)
*C03C 3/087* (2006.01)
*C03C 8/04* (2006.01)
*C03C 8/20* (2006.01)
*C04B 111/00* (2006.01)
*C04B 111/20* (2006.01)

(52) U.S. Cl.
CPC .............. *C03C 8/20* (2013.01); *C04B 41/009* (2013.01); *C04B 41/5022* (2013.01); *C04B 41/52* (2013.01); *C04B 41/86* (2013.01); *C04B 41/89* (2013.01); *E04C 2/02* (2013.01); *C03C 2209/00* (2013.01); *C04B 2111/00362* (2013.01); *C04B 2111/2069* (2013.01); *Y10T 428/24355* (2015.01); *Y10T 428/252* (2015.01)

(58) Field of Classification Search
CPC ............ C04B 41/5023; C04B 41/5024; C04B 41/5031; C04B 41/5035; C04B 41/5042; C04B 41/52; C04B 41/86; C04B 41/89; E04C 2/02; B32B 3/14; B32B 5/16; B32B 17/068; B32B 17/10; B32B 17/10165
USPC ....... 428/141, 142, 143, 144, 145, 147, 149, 428/156, 168, 172, 195.1, 206, 209, 212, 428/213
See application file for complete search history.

(56) References Cited

U.S. PATENT DOCUMENTS

| | | | | |
|---|---|---|---|---|
| 4,174,226 A | * | 11/1979 | Fitzpatrick | C04B 28/342 106/690 |
| 4,287,849 A | * | 9/1981 | Walchhuetter | B28B 11/04 118/221 |
| 4,443,520 A | * | 4/1984 | Braithwaite, Jr. | C09K 21/14 427/372.2 |
| 4,881,348 A | * | 11/1989 | Davis | E04F 13/0835 110/338 |
| 5,336,453 A | * | 8/1994 | Giller | C04B 35/111 264/615 |
| 5,698,021 A | | 12/1997 | Dorsett | |
| 6,007,926 A | | 12/1999 | Provenzano et al. | |
| 6,086,948 A | | 7/2000 | Roth et al. | |
| 6,132,844 A | * | 10/2000 | Altshuler | C09J 7/0217 156/327 |
| 2002/0098362 A1 | * | 7/2002 | Mushovic | B28B 11/04 428/413 |
| 2002/0143089 A1 | * | 10/2002 | Minghetti | C08K 3/22 524/430 |
| 2004/0040218 A1 | * | 3/2004 | Aleonard | C04B 35/109 51/309 |
| 2004/0253432 A1 | | 12/2004 | Nonninger et al. | |
| 2008/0311302 A1 | * | 12/2008 | Cook | C03C 1/026 427/376.2 |
| 2010/0251774 A1 | * | 10/2010 | Peterson | C04B 41/009 65/193 |

FOREIGN PATENT DOCUMENTS

WO 2008152154 A1 12/2008
WO 2012025899 A1 3/2012

* cited by examiner

SYSTEMS AND METHODS FOR CLEANABLE AND SLIP RESISTANT TILE

CROSS-REFERENCE TO RELATED APPLICATION

This application claims priority under 35 U.S.C. § 119(e) to U.S. Provisional Patent Application Ser. No. 61/859,550, filed 29 Jul. 2013, and entitled Systems and Methods for Cleanable and Slip Resistant Tile, the entire contents and substance of which is hereby incorporated by reference as if fully set forth below.

BACKGROUND

1. Field of the Invention

Embodiments of this disclosure relate to tile systems and methods, and more particularly, to systems and methods for cleanable, slip resistant tile.

2. Description of Related Art

A variety of tile systems and methods are known. In general, tile is a manufactured material used for covering floors, walls, roofs, and other similar areas. In many situations, tile can provide a desirable appearance, texture, feel, or other surface characteristic that is difficult or impossible to achieve by other means. Tiles are commonly made from ceramic materials, although they can be made from a variety of other materials such as wood, stone, metal, and glass. Moreover, tiles commonly have coatings that influence the surface characteristics of the tile. Some coatings, for example, can influence the color, roughness, or gloss of the tile.

Two important characteristics of a tile are (1) the ability to clean the tile (the "clean-ability" of the tile) and (2) the slip resistance of the tile. Clean-ability is important because dirty tiles are rarely desirable. In circumstances where tile is used on a floor, wall, or roof, for example, the tile will likely become dirty over time, and it will likely become desirable to clean the tile so that the tile provides a desired appearance. In addition, the slip resistance of a tile can be important to prevent people, machines, or other objects from slipping on the tile. In many circumstances, for example, it is desirable to prevent people from slipping on a tile floor, especially when the floor is wet.

Existing tiles and existing tile coatings do not provide for tiles that have both high clean-ability and high slip resistance. This is because, in conventional designs, as the slip resistance of the tile increases the clean-ability decreases, and as the clean-ability increases the slip resistance decreases. In other words, clean-ability and slip resistance typically have an inverse relationship because the surface that is required to optimize either cannot optimize the other. The rule of thumb is that a rough and textured surface has high slip resistance and low clean-ability, whereas a smooth and glassy surface has high clean-ability and low slip resistance.

What is needed, therefore, is a tile, tile coating, or similar coating that provides both high clean-ability and high slip resistance. It is to this need that embodiments of this disclosure are primarily directed.

SUMMARY

Briefly described, embodiments of this disclosure comprise a tile that is both highly cleanable and slip resistant. The tile can comprise a surface coating. The surface coating can comprise a base formula that has particles dispersed therein. The structure and chemistry of the surface coating and particles can enable the coating to be fired at high, desirable temperatures and to exhibit high clean-ability and high slip resistance.

Embodiments of this disclosure can comprise a tile that can comprise a substrate and a surface coating. In some embodiments, the surface coating can comprise a base formula. In some embodiments, the surface coating can comprise particles comprising alumina-zirconium-silicate. In some embodiments, the surface coating can comprise particles comprising tabular alumina. In some embodiments, the surface coating can comprise particles comprising alumina trihydrate. In some embodiments, the surface coating can comprise particles comprising tabular alumina and particles comprising alumina trihydrate.

In some embodiments, the weight of particles comprising alumina-zirconium-silicate and the weight of particles comprising alumina trihydrate can be substantially equal. In some embodiments, the weight ratio of particles comprising alumina-zirconium-silicate to particles comprising alumina trihydrate to particles comprising tabular alumina can be from 3:3:1 to 5:5:1. In some embodiments, the weight ratio of particles comprising alumina-zirconium-silicate to particles comprising alumina trihydrate to particles comprising tabular alumina can be approximately 4:4:1.

In some embodiments, substantially all of the particles can have a diameter less than 33.011 μm. In some embodiments, about 90% of the particles can have a diameter less than 20.0436 μm. In some embodiments, about 50% of the particles can have a diameter less than 7.25089 μm.

In some embodiments, the tile can comprise a base coating disposed substantially between the substrate and the surface coating. In some embodiments, the base coating can support the surface coating during a firing process, even when at least a portion of the firing process occurs at above 1150 degrees Celsius. In some embodiments, the surface coating can provide a clean-ability ΔE of 0.6 to 1.0 and a dynamic coefficient of friction of 0.60 to 0.95. In some embodiments, the base formula can comprise NB-0022 glaze.

Embodiments of this disclosure can also comprise a tile comprising a substrate. In some embodiments, the tile can further comprise a surface coating that can form a surface of the tile. In some embodiments, the surface coating can provide a clean-ability ΔE of 0.6 to 1.0 and a dynamic coefficient of friction of 0.60 to 0.95. In some embodiments, an average RMS of the tile can be between 11.5 μm and 12.6 μm. In some embodiments, an average Ra of the tile can be between 9.5 μm and 11.0 μm.

Embodiments of this disclosure can also comprise a method of making a tile. In some embodiments, the method can comprise providing a substrate as a first layer of the tile. In some embodiments, the method can further comprise providing a surface coating as a second layer of the tile, and the surface coating can comprise a base formula and have particles mixed into the base formula. In some embodiments, the method can further comprise firing the tile at a temperature above 1150 degrees Celsius. In some embodiments, the method can further comprise firing the tile at a temperature above 1230 degrees Celsius. In some embodiments, the method can further comprise providing a base coating as a third layer of the tile. In some embodiments, the base coating can be disposed substantially between the substrate and the surface coating, and the base coating can support the surface coating during the entire firing process.

These and other embodiments of this disclosure are described in the Detailed Description below and the accompanying figures. Other embodiments and features of embodiments of this disclosure will become apparent to those of ordinary skill in the art upon reviewing the following Detailed Description in concert with the figures. While features of this disclosure may be discussed relative to certain embodiments and figures, all embodiments of this disclosure can include one or more of the features discussed herein. While one or more embodiments may be discussed as having certain advantageous features, one or more of such features may also be used with the various embodiments of the invention discussed herein. In similar fashion, while exemplary embodiments may be discussed as system or method embodiments, it is to be understood that such exemplary embodiments can be implemented in various devices, systems, and methods of this disclosure.

BRIEF DESCRIPTION OF THE DRAWINGS

Various features and advantages of this disclosure may be more readily understood with reference to the following Detailed Description taken in conjunction with the accompanying drawing figures, wherein like reference numerals designate like structural elements, and in which.

DETAILED DESCRIPTION

Figure 1A:
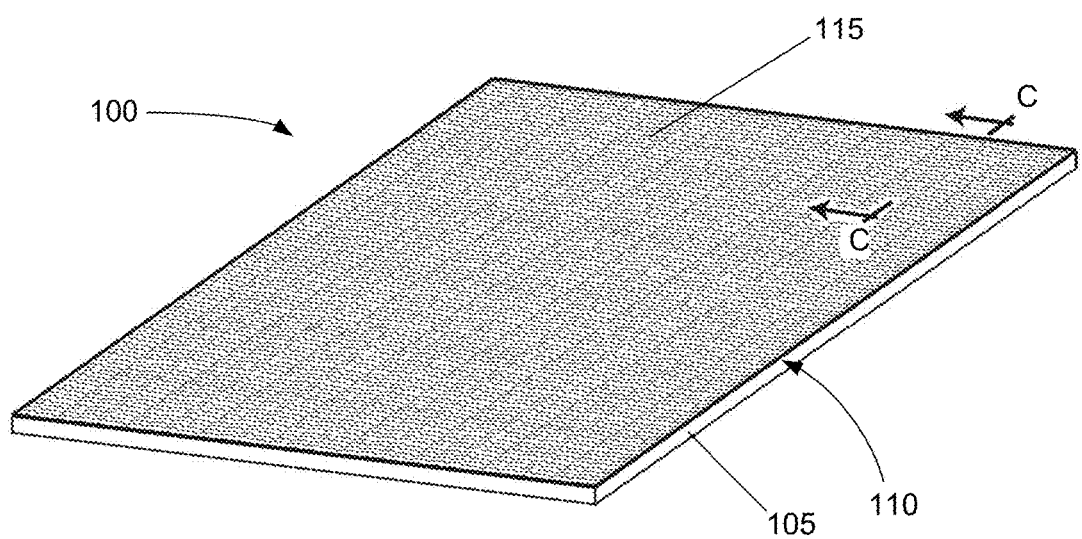
FIG. 1A depicts a tile with improved clean-ability and slip resistance, in accordance with some embodiments of this disclosure.

To facilitate an understanding of the principles and features of the various embodiments of the invention, various illustrative embodiments are explained below. Although exemplary embodiments of the invention are explained in detail as being systems and methods for cleanable and slip resistant tile, it is to be understood that other embodiments are contemplated, such as embodiments employing other types of surfaces, coatings, tiles, or tile manufacturing methods. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

To facilitate an understanding of the principles and features of this disclosure, various illustrative embodiments are explained below. In particular, various embodiments of this disclosure are described as cleanable and slip resistant tile and related methods. Some embodiments of the invention, however, may be applicable to other contexts, and embodiments employing these embodiments are contemplated. For example and not limitation, some embodiments of the invention may be applicable to various types of surfaces, floor or ceiling coatings, other surface coatings, or other types of surfaces altogether. Accordingly, where terms such as "tile" or "coating" or "floor" or related terms are used throughout this disclosure, it will be understood that other devices, entities, objects, or activities can take the place of these in various embodiments of the invention.

As described above, a problem with existing tile systems and methods is that they do not provide both high clean-ability and high slip resistance. This is because, traditionally, clean-ability and slip resistance have an inverse relationship. Thus, in conventional tile and flooring designs, a rough and textured surface provides high slip resistance and low clean-ability, and a smooth and glassy surface provides high clean-ability and low slip resistance.

The present disclosure, however, describes tiles, coatings, and related methods that provide both high clean-ability and high slip resistance. Thus, the tiles, coatings, and methods of this disclosure can provide the advantages of being easy to clean and preventing slipping.

There are several different methods that can be used to evaluate the clean-ability and slip resistance of a flooring material, such as a tile. These methods can be helpful to quantify the clean-ability and the slip resistance, such that these qualities can be compared to other tiles.

Clean-ability can be defined as the ease with which a surface can be cleaned. A high clean-ability represents a surface that is relatively easy to clean, while a low clean-ability represents a surface that is relatively difficult to clean. The methods for measuring clean-ability frequently involve measuring the color difference caused by the application of a staining material on a surface. The staining material can be, for example and not limitation, any liquid or solid that is not repelled by a typical ceramic surface and that is a contrasting color when compared to the surface. Dark grout, for example, can be a staining material for a very light colored tile.

To measure clean-ability, the color of the flooring material is first measured when clean. A staining material is then applied and a cleaning routine is undergone to attempt to remove the staining material. A second color measurement is then taken. The color difference between the first measurement and the second measurement is then calculated.

The color difference can be calculated in a variety of ways. Typically, color measurements are made using the L*, a*, b* color space (CIELAB), as will be known by those of skill in the art to which this disclosure pertains. Thus, the color difference of an individual point can be calculated using the vector $\Delta E^*$, which reflects the difference in the length of the vector between the L*, a*, and b* points before and after the staining and cleaning. When looking at a whole tile, an average $\Delta E^*$, termed $\Delta E$ or clean-ability $\Delta E$, can be calculated and used to determine the clean-ability of the tile. A high $\Delta E$ indicates a tile with low clean-ability, and a low $\Delta E$ indicates a tile with high clean-ability. Using this method, traditional tiles have a clean-ability $\Delta E$ of between 1.0 and 2.0. A tile with high clean-ability can have a $\Delta E$ of less than or equal to 1.0, and a tile with low clean-ability can have a $\Delta E$ of 2.0 or more.

To measure slip resistance, a coefficient of friction, or COF, is commonly used. As will be known by those of skill in the art, the COF is a measurement which indicates the amount of traction a surface exerts to an object on the surface. Surfaces typically have static a static COF, or SCOF, and a dynamic COF, or DCOF. The SCOF can be the initial COF exerted by a surface on an object that is stationary. The DCOF can be the COF exerted by a surface on an object that is moving across the surface. High COF values typically coincide with high slip resistance.

One method for measuring the COF of ceramic and similar flooring surfaces is ASTM B101.3, which is a standard from the American Society for Testing Materials. ASTM B101.3 can be used to measure the DCOF when the flooring is wet. In many countries, the wet DCOF is typically the most important measurement in slip-and-fall investigations because the measurement typically reveals a worst case scenario of the flooring (i.e., the most slippery state of the flooring that is commonly encountered). This is because, when wet, the DCOF of a flooring material can become less dependent on the pressure between the flooring surface and the moving object and can lower the DCOF as a result. A typical value of the DCOF for a wet ceramic floor tile is approximately 0.42. This is the minimum acceptable value in many commercial markets, such as those in the United States. A tile that has high slip resistance can have a wet DCOF of at least 0.60, and a tile with low slip resistance can have a wet DCOF of below 0.42.

Known tiles and coatings do not provide a flooring material with a high wet DCOF (and thus high slip resistance) that also has high clean-ability. Generally, as the wet DCOF increases the clean-ability decreases. The two properties typically have an inverse relationship because the surface that is required to optimize either cannot optimize the other. A rough and textured surface is generally hard to clean because the stain material, and other undesirable materials, can be trapped within the narrow crevices of the surface. A smooth and glassy surface is generally slippery because it does not have micro- or macro-structures (peaks and valleys) with which another material, for example the sole of a shoe, can interact and interlock. A product that provides high slip resistance and a high clean-ability could be ideal for a high traffic or commercial area where there is significant concern for slipping on wet surfaces and the desire for a clean floor. Such a product could also be ideal for in-home use, as it could prevent residents and their guests from slipping and failing and sustaining injury, while nevertheless enabling the floor to be easily cleanable.

Embodiments of the present disclosure provide such tiles, coatings, and related methods. In some embodiments, wet DCOFs at or greater than 0.60 can be achieved while having a clean-ability $\Delta E$ that is equal to or less than 1.0.

Figure 1B:
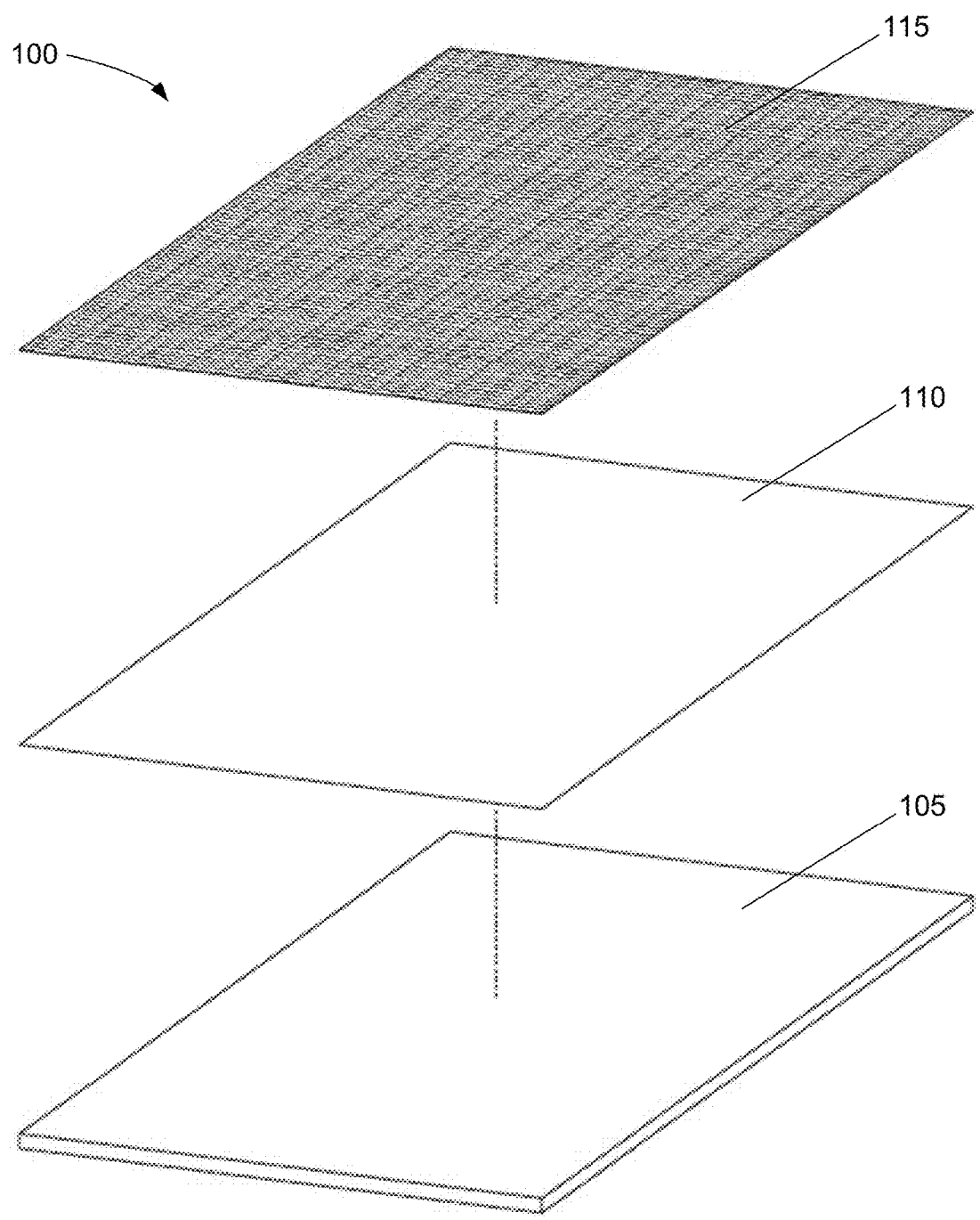
FIG. 1B depicts an exploded view of the tile of FIG. 1A, in accordance with some embodiments of this disclosure.
Figure 1C:
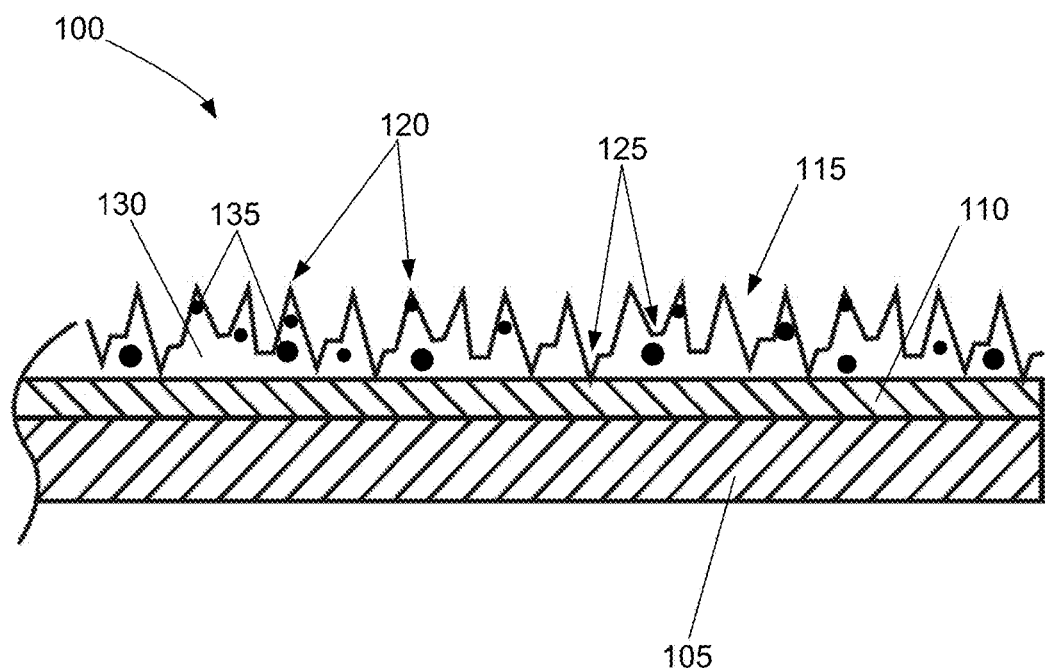
FIG. 1C depicts a close-up of cross-section C-C of the tile of FIG. 1A, in accordance with some embodiments of this disclosure.

FIG. 1A shows a tile 100 in accordance with some embodiments of this disclosure. FIG. 1B shows an exploded view of the tile 100 of FIG. 1A, and FIG. 1C shows a close-up of cross-section C-C of the tile 100 of FIG. 1A. As can be seen in FIGS. 1A-1C, the tile 100 can have a substrate 105, an optional base coating 110, and a surface coating 115. Without being bound by any particular theory, in some embodiments, the surface structure of the surface coating 115 can enable the tile 100 to provide the properties of high clean-ability and high slip resistance. More specifically, the height, shape, and transition between "peaks" 120 and "valleys" 125 in the surface coating 115 can provide these properties.

Those of skill in the art will understand that when the peaks 120 and valleys 125 of the surface coating 115 are unevenly spaced, and when there is a significant height different between the top of peaks 120 and the bottom of valleys 125, the resulting surface will be rough, and the slip resistance will be high. In some embodiments of this disclosure, therefore, the height difference between peaks 120 and valleys 125 can be large and the variation in height and spacing can be sufficient to provide high slip resistance. In addition, those of skill in the art will understand that when the change in height from the peaks 120 and valleys 125 of the surface coating 115 occurs in a relatively smooth manner over a wide enough distance, debris can be more easily removed from between the peaks 120 and valleys 125, and clean-ability will be high. In some embodiments, therefore, the peaks 120 and valleys 125 can be far enough apart with sufficiently smooth transitions to provide high clean-ability. Thus, in some embodiments, the change in height from the peaks 120 and valleys 125 can be large enough to provide high slip resistance and the distance between peaks 120 and valleys 125 can be far enough to provide high clean-ability. More specifically, the change in height from the peaks 120 and valleys 125 can be large enough to provide a DCOF at or above 0.60 and the distance between peaks 120 and valleys 125 can be far enough to provide a clean-ability ΔE of less than or equal to 1.0.

In some embodiments, for example, the DCOF of the surface of the tile 100, specifically the surface coating 115 of the tile 100, can range from 0.60 to 0.95. In some embodiments, the DCOF can range from 0.60 to 0.75. In some embodiments, the DCOF can range from 0.65 to 0.75. In some embodiments, the DCOF can range from 0.60 to 0.80. In some embodiments the clean-ability ΔE of surface of the tile 100, specifically the surface coating 115 of the tile 100, can range from 0.2 to 1.0. Moreover, in some embodiments, the clean-ability ΔE can range from 0.5 to 1.0. In some embodiments, the clean-ability ΔE can range from 0.6 to 1.0. In some embodiments, the clean-ability ΔE can range from 0.8 to 1.0.

Figure 2A:
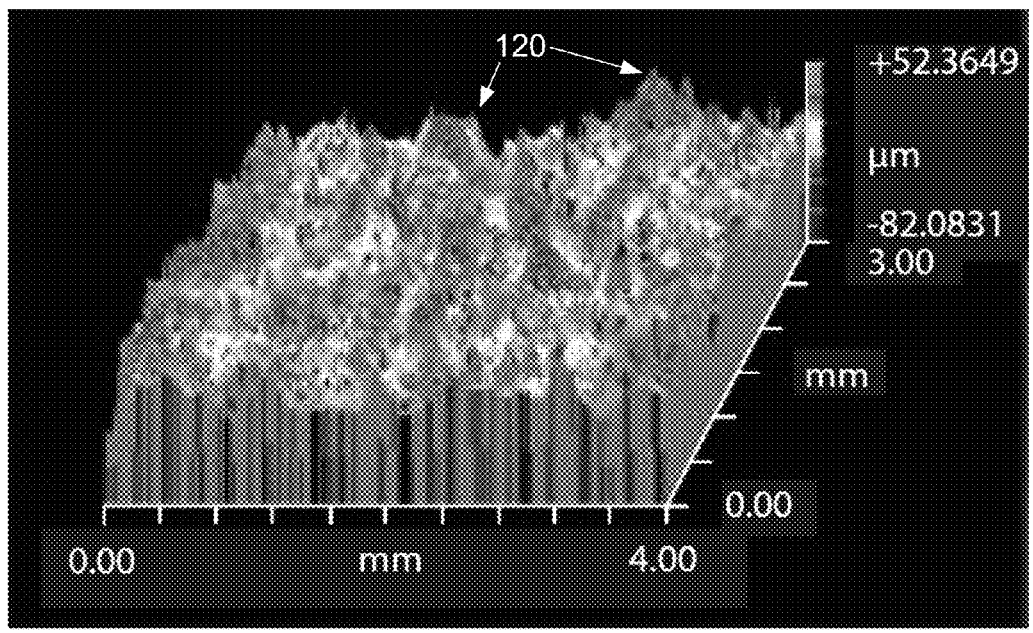
FIG. 2A depicts an interferometer output showing a three-dimensional view of the surface structure of the tile of FIG. 1A, in accordance with some embodiments of this disclosure.
Figure 2B:
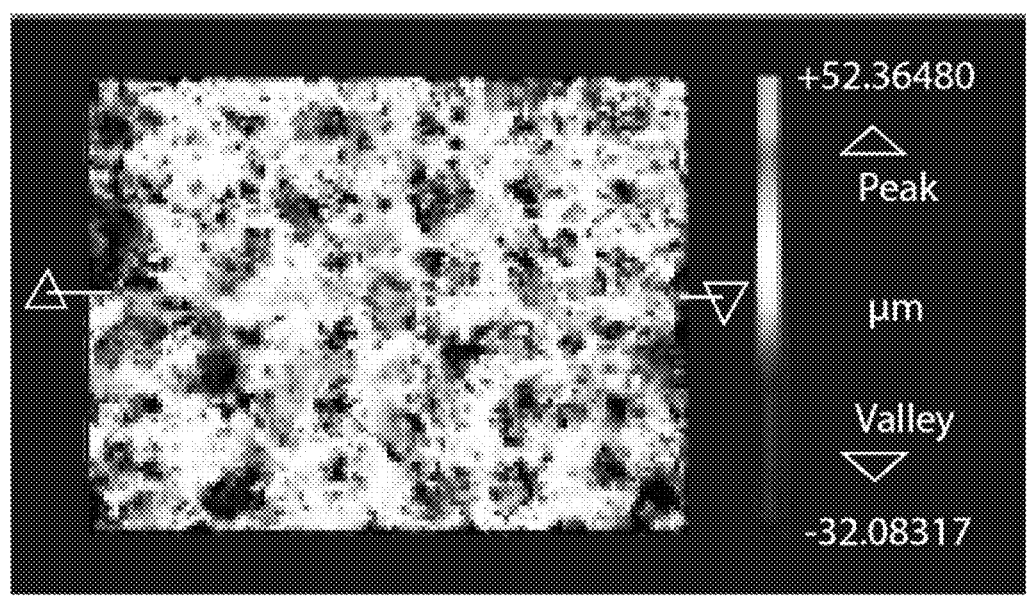
FIG. 2B depicts an interferometer output that illustrates a two-dimensional, overhead view of the surface structure of the tile of FIG. 1A, in accordance with some embodiments of this disclosure.
Figure 2C:
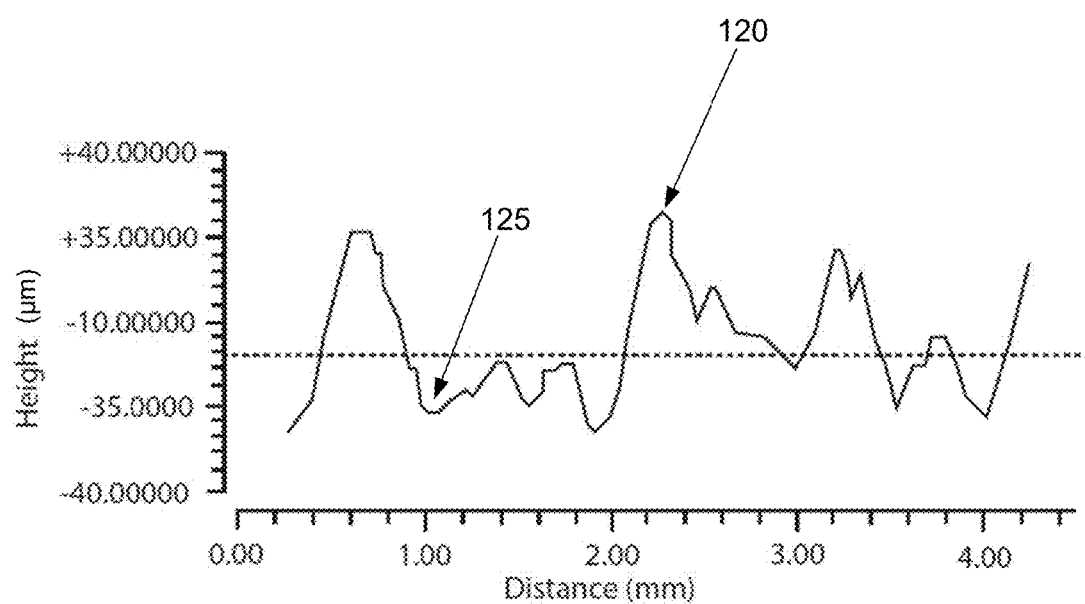
FIG. 2C is a graph generated by an interferometer that shows the surface structure of the tile of FIG. 1A, in accordance with some embodiments of this disclosure.

FIGS. 2A-2C depict readings from an interferometer that illustrate the surface structure of an exemplary tile 100 in accordance with this disclosure. As those of skill in the art will understand, an interferometer is a device capable of determining the surface structure of a material by measuring the phase difference between similar electromagnetic waves. FIG. 2A is an interferometer output that illustrates a three-dimensional view of the surface structure. FIG. 2B is an interferometer output that illustrates a two-dimensional, overhead view. FIG. 2C is a graph of the surface structure generated by the interferometer that more clearly shows the peaks 120 and valleys 125 over a given portion of the surface.

Figure 3A:
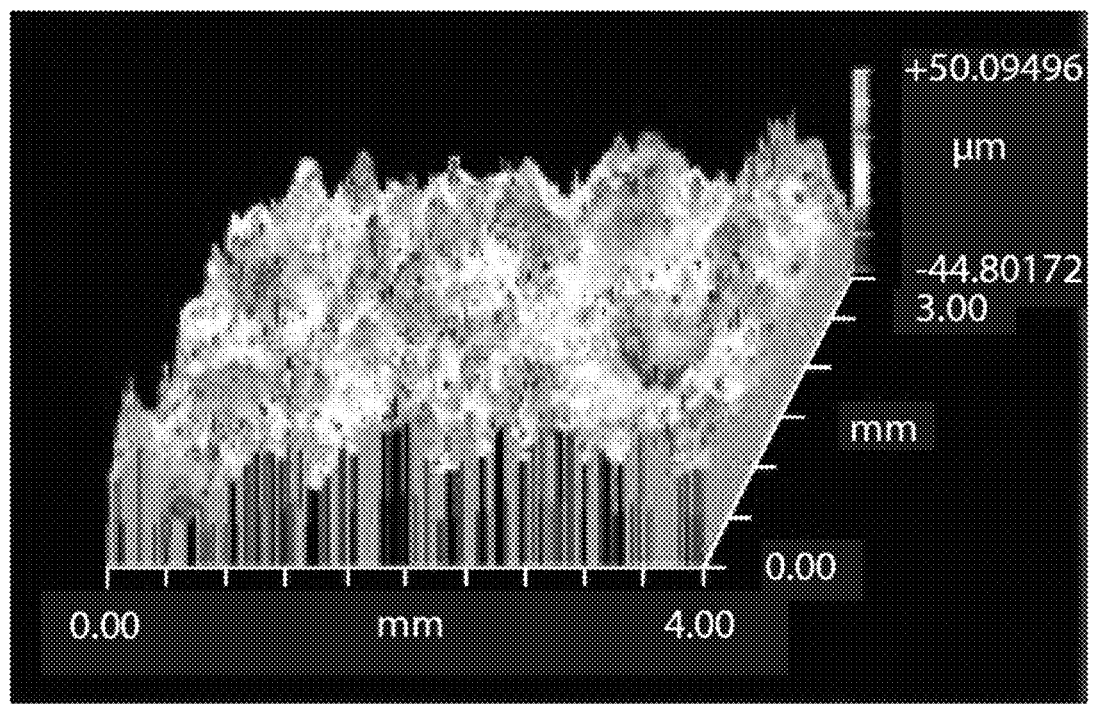
FIG. 3A depicts an interferometer output showing a three-dimensional view of the surface structure of a conventional tile.
Figure 3B:
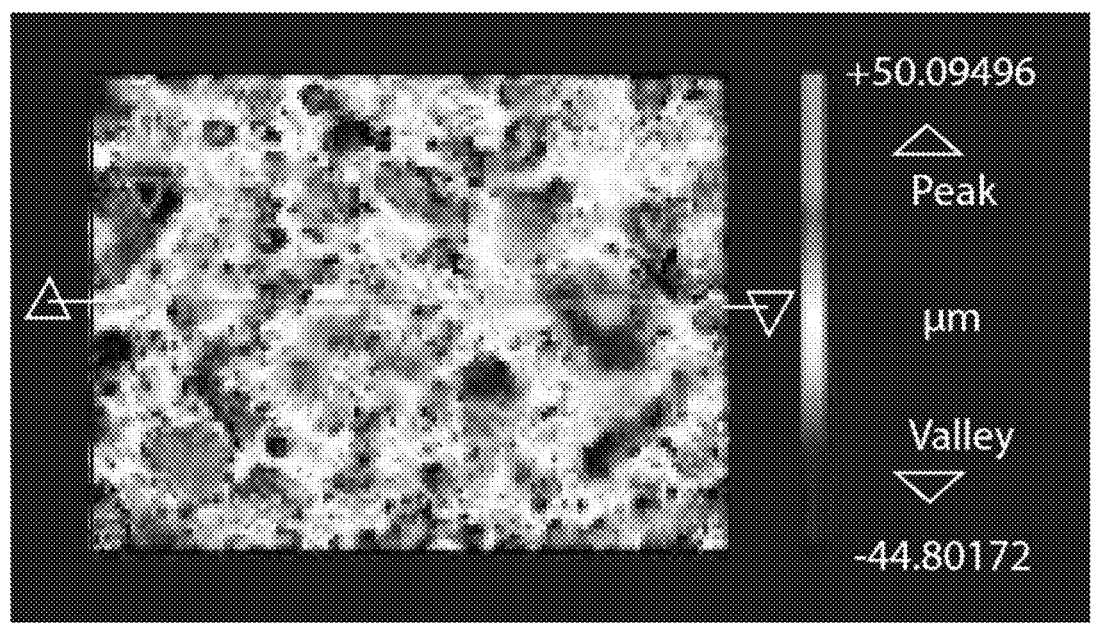
FIG. 3B depicts an interferometer output that illustrates a two-dimensional, overhead view of the surface structure of the conventional tile of FIG. 3A.
Figure 3C:
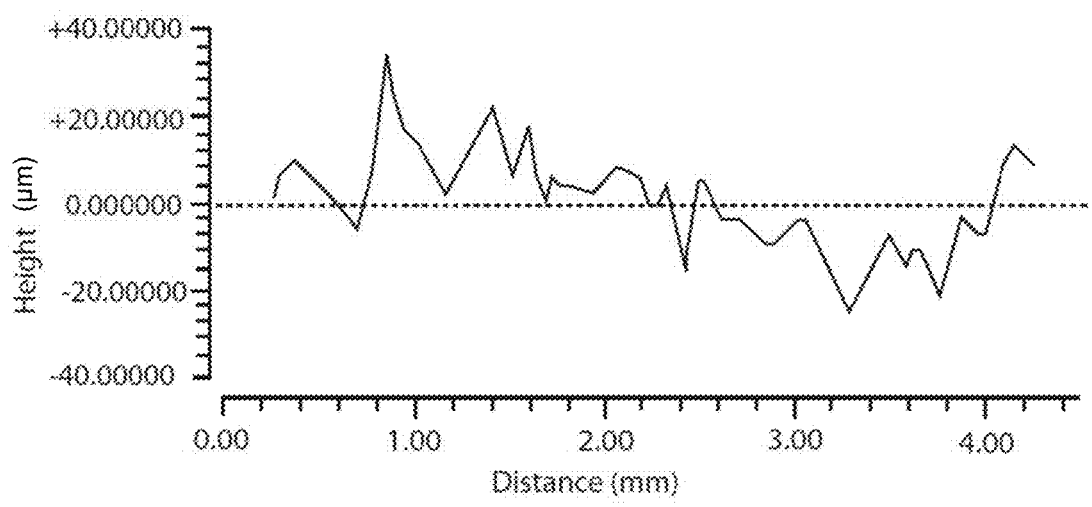
FIG. 3C is a graph generated by an interferometer that shows the surface structure of the conventional tile of FIG. 3A.

FIGS. 3A-3C show readings from an interferometer that illustrates the surface structure of a standard tile. Like FIG. 2A, FIG. 3A is an interferometer output that illustrates a three-dimensional view of the surface structure. FIG. 3B, similar to FIG. 2B, is an interferometer output that illustrates a two-dimensional, overhead view. And similar to FIG. 2C, FIG. 3C is a graph generated by the interferometer that more clearly shows the peaks and valleys over a given portion of the surface. Comparing these FIGS. 2A-2C and 3A-3C, one can see that neighboring peaks 120 and valleys 125 have a larger height differential in FIGS. 2A-2C, increasing DCOF and slip resistance. Moreover, the transition between peaks 120 and valleys 125 is smoother in FIGS. 2A-2C, decreasing clean-ability ΔE and increasing clean-ability.

Those of skill in the art to which this disclosure pertains will understand that there are several variables that can be measured by an interferometer. The peak-to-valley distance, or PV, is the average maximum distance from a peak of the surface structure to a neighboring valley. RMS is the root mean square roughness and is an indication of the standard deviation of the peak-to-valley height measurements for a given area of a tile. The Ra is the average roughness and an indicator of the deviation from the reference plane. As those of skill in the art will understand, the reference plane is a plane where the integral of the three-dimensional surface of a tile is equal to zero. Thus, the area between the reference plane and the measured surface has two equivalent sections, one is where the measured surface is above the reference plane and the other is where the measured surface is below the reference plane.

The inventors of the subject matter disclosed herein performed several tests, and in one set of tests, five tile 100 samples in accordance with this disclosure, as well as five standard tile samples were measured by an interferometer. The average and the standard deviation of the PV, RMS, and Ra were then calculated. Table 1 shows the results.

TABLE 1

|  | Measurement | Average | St. Dev |
|---|---|---|---|
| Tile as taught by this Disclosure | PV (μm) | 66.32 | 14.87 |
|  | RMS (μm) | 12.08 | 2.54 |
|  | Ra (μm) | 10.2 | 3.08 |
| Standard Tile | PV (μm) | 70.06 | 16.26 |
|  | RMS (μm) | 10.72 | 1.06 |
|  | Ra (μm) | 8.69 | 0.93 |

Table 2 shows the high and low values for the same samples.

TABLE 2

|  | Measurements | Low | High |
|---|---|---|---|
| Tile as taught by this Disclosure | PV (μm) | 50 | 80 |
|  | RMS (μm) | 11.5 | 14 |
|  | Ra (μm) | 9.5 | 13 |
| Standard Tile | PV (μm) | 50 | 80 |
|  | RMS (μm) | 9 | 11 |
|  | Ra (μm) | 7 | 9 |

Table 1 and Table 2 show that the PV for the tile 100 of the present disclosure can be comparable to the conventional tile. The RMS and Ra, however, can be larger for the tile 100 as taught by this disclosure. These measurements indicate that the surface structure has a larger inter-facial surface area due to a larger distribution of peaks 120 and valleys 125. This larger inter-facial surface area improves the slip resistance of the tile 100 compared to traditional tiles. As those of skill in the art will understand, a material with a larger inter-facial surface area will typically be more difficult to slide an object across than the same material of the same size with a smaller inter-facial surface area. The larger RMS, and Ra can be seen by comparing FIGS. 2A, 2B, and 2C, to FIGS. 3A, 3B, and 3C. The smoother transitions between peaks 120 and valleys 125 can also be seen.

In some embodiments, the average RMS of a tile 100 of this disclosure can range from 5 μm to 20 μm. In some embodiments, the average RMS can range from 11 μm to 14 μm. In some embodiments, the average RMS can range from 11.5 μm to 12.6 μm, and in some embodiments the average RMS can range from 11.9 μm to 12.2 μm. In some embodiments, the average Ra of a tile 100 of this disclosure can range from 5 μm to 20 μm. In some embodiments, the average Ra can range from 9.0 μm to 16 μm. In some embodiments, the average Ra can range from 9.5 μm to 11 μm, and in some embodiments the average Ra can range from 9.7 μm to 10.7 μm. In some embodiments, the RMS of a tile 100 of this disclosure can be 11.5 or greater. In some embodiments, the Ra of a tile 100 of this disclosure can be 9.5 or greater.

The PV, RMS, and Ra of tiles 100 of the present disclosure are not limited by the values in Table 1 and Table 2. Rather, these tables show exemplary results and measurements. In some embodiments, for example, the PV of a tile can range from 30 µm to 100 µm. Likewise the RMS can range from 5 µm to 20 µm, and the Ra can range from 5 µm to 20 µm.

As those of skill in the art will understand, the surface structure of a tile 100 can be determined, at least in part, by a surface coating 115. In some embodiments, the surface coating 115 can comprise a base formula 130 and one or more particulates 135 dispersed in the base formula. The chemical and particulate 135 make-up of the surface coating 115, along with the properties the surface coating 115 exhibits, can enable the surface structure, such as the peaks 120 and valleys 125, of the final product to form in a manner that provides high slip resistance and high clean-ability.

As described above, embodiments of the present invention are applicable to tile applications. In some embodiments, for example, a tile surface with high clean-ability and high slip resistance can be created using a surface coating 115 with solid particles 135 dispersed in the coating. The surface coating 115, or similar coatings, can also be used with other types of flooring. For example, in some embodiments, a surface coating 115 in accordance with this disclosure can be applied to a wood floor, concrete floor, or other non-tile surface to provide high clean-ability and high slip resistance.

In some embodiments, the chemistry of the base formula 130 can be important to the final surface characteristics of the tile 100. In some embodiments, for example, the chemistry of the base formula 130 can be important at least because the base formula 130 should maintain a sufficiently high molten viscosity to support any particles 135 suspended within the base formula 130.

While the chemical make-up of the base formula 130 can vary, an exemplary base formula 130 is described in Table 3 below. The components of the exemplary base formula 130, which can be combined to produce the chemical make-up, are also shown. The percentages shown in Table 3 are weight percentages based upon the total weight of the dried base formula 130 without added particles 135.

TABLE 3

| Base Formula Chemical Make-up | | Base Formula Components | |
|---|---|---|---|
| $K_2O$ | 2.63-3.22% | Frit | 50-60% |
| $Na_2O$ | 3.30-4.30% | Clay | 10-18% |
| CaO | 9.00-13.00% | Flux | 20-30% |
| MgO | 0.08-0.24% | Stabilizer | 1-3% |
| BaO | 1.00-1.40% | | |
| $P_2O_5$ | 0-0.30% | | |
| ZnO | 5.87-6.35% | | |
| $Al_2O_3$ | 20.23-28.8% | | |
| $ZrO_2$ | 1.20-1.90% | | |
| $Fe_2O_3$ | 0.1-0.26% | | |
| $SiO_2$ | 42.63-52.8% | | |
| $TiO_2$ | 0.04-0.11% | | |
| $H_2O$ | 1.00-2.50% | | |

The chemical make-up of the base formula 130, however, is not limited by the values in Table 3. Rather, Table 3 shows an exemplary composition. In some embodiments, for example, $K_2O$ can be present in an amount ranging from 1% to 6%, $Na_2O$ can be present in an amount ranging from 1% to 8%, and CaO can be present in an amount ranging from 3% to 20%. In some embodiments, MgO can be present in an amount ranging from 0.03% to 0.5% and BaO can be present in an amount ranging from 0.3% to 5%. Moreover, in some embodiments, $P_2O_5$ can present in an amount ranging from 0% to 2%, ZnO can be present in an amount ranging from 2% to 11%, $Al_2O_3$ can be present in an amount ranging from 5% to 40%, $ZrO_2$ can be present in an amount ranging from 0.4% to 5%, and $Fe_2O_3$ can be present in an amount ranging from 0.03% to 0.5%. In some embodiments, $SiO_2$ can be present in an amount ranging from 10% to 80%, $TiO_2$ can be present in an amount ranging from 0.01% to 0.5%, and $H_2O$ can be present in an amount ranging from 0.3% to 10%. Additionally, in some embodiments, frit can be present in an amount ranging from 30% to 90%, clay can be present in an amount ranging from 1% to 50%, flux can be present in an amount ranging from 5% to 50%, and stabilizer can be present in an amount ranging from 0.1% to 10%.

Thus, in some embodiments, the surface coating can have a composition of 1-4 wt % potassium, 1-6 wt % sodium, 5-20 wt % calcium, 3-10 wt % zinc, 15-40 wt % aluminum, and 30-60 wt % silicon. The surface coating can have a composition of 2-4 wt % potassium, 2-5 wt % sodium, 7-15 wt % calcium, 3-8 wt % zinc, 18-35 wt % aluminum, and 40-60 wt % silicon. The surface coating can have a composition of 2.5-3.5 wt % potassium, 3-5 wt % sodium, 8-14 wt % calcium, 4-7 wt % zinc, 20-30 wt % aluminum, and 40-55 wt % silicon. In some embodiments, the surface coating can contain 1-4 wt % potassium, 2-4 wt % potassium, or 2.5-3.5 wt % potassium. In some embodiments, the surface coating can contain 1-6 wt % sodium, 2-5 wt % sodium, or 3-5 wt % sodium. In some embodiments, the surface coating can contain 5-20 wt % calcium, 7-15 wt % calcium, 8-14 wt % calcium, or 9-13 wt % calcium. In some embodiments, the surface coating can contain 3-10 wt % zinc, 3-8 wt % zinc, 4-7 wt % zinc, or 5-6.5 wt % zinc. In some embodiments, the surface coating can contain 15-40 wt % aluminum, 18-35 wt % aluminum, or 20-30 wt % aluminum. In some embodiments, the surface coating can contain 30-60 wt % silicon, 40-60 wt % silicon, or 40-55 wt % silicon. In each instance, the elemental composition is recited as the percent weight of the most common oxide, i.e. the oxides described above. In some embodiments, the surface coating can also contain less than 2 wt % of magnesium, barium, iron, and titanium. In some embodiments, the surface coating can contain less than 1 wt % of magnesium, barium, iron, and titanium, or less than 0.5 wt % of magnesium, barium, iron, and titanium. Also, in some embodiments, the surface coating can contain less than 2 wt % zirconium. In some embodiments, magnesium, barium, iron, and titanium can each be present in at least about 0.02 wt %.

In some embodiments, other components can be present, and/or some of the components listed in Table 3 can be absent. In other words, the chemical make-up of the base formula 130 is variable both by the components included and the amount of each component, and is not limited by the example shown in Table 3.

In some embodiments, the base formula 130 is created by processing various materials in water. The materials used in the base formula 130 can be somewhat flexible or variable. In some embodiments, the base formula 130 can be a glaze, such as NB-0022 glaze. Most glazes have a frit (processed glass with a specific mineralogy), clay (alumina with minerals), and an opacifier (a material with a large percentage of Zirconium Oxide). The base formula 130 can incorporate the various raw materials by their weight. In some embodiments, the materials are put into a ball mill. As those of skill in the art will understand, a ball mill is a type of grinder used to grind materials into a very fine powder which allows for more uniform behavior. Certain amounts of water, along with suspension agents, can also be added to the ball mill.

The suspension agents can help keep the particles dispersed and suspended within the water during processing. Once the base formula 130 has been ground, it can be removed from the ball mill and applied onto a substrate.

As described above, solid particles 135 can be added to the base formula 130 to provide the surface coating with desirable surface properties, such as high slip resistance while maintaining high clean-ability. The particles 135 can be added to the base formula 130 at various stages. In some embodiments, for example, the particles 135 can be added while the components of the base formula 130 are being combined, such as in a ball mill. In some embodiments, the particles 135 can be added to the base formula 130 and mixed into the base formula 130 after the base formula 130 is made. In these embodiments, the particles 135 can be combined with the base formula 130 in the ball mill or after the base formula 130 is removed from the ball mill.

In some embodiments, the solid particles 135 can comprise an alumina-zirconium-silicate, also known as AZS. AZS can enable the surface coating 115 to have a large temperature stability range and can also prevent the surface coating 115 from becoming opaque. In some embodiments, up to 80% by weight of the solid particles 135 can be AZS. In some embodiments, between 40% and 95% of the solid particles 135 can be AZS. In some embodiments, the remaining percentage of the solid particles 135, i.e., those that are not AZS, can comprise alumina, such as tabular alumina. Thus, in some embodiments, the ratio of AZS particles 135 to other particles 135 (such as tabular alumina particles 135), by weight, can be 4:1 or approximately 4:1. In some embodiments, however this ratio can be from 3:1 to 5:1.

In some embodiments, the AZS that is used can be sold under the trade name Zirduro. In some embodiments, Zirduro can comprise a zirconium and silicon oxide known by the trade name Zircon.

In some embodiments, the tabular alumina can be calcined alumina. In some embodiments, tabular alumina can be recrystallised or sintered α-alumina. Tabular alumina can also be flat tablet-shaped crystals. In some cases, tabular alumina can be produced by pelletizing, extruding, or pressing calcined alumina into shapes and then heating these shapes to a temperature just under their fusion point. After calcination, the sintered alumina can be used for some applications, e.g., catalyst beds, or they can be crushed, screened, and ground to produce a wide range of sizes. As the material has been sintered it can have an especially low porosity, high density, low permeability, good chemical inertness, high refractoriness and can be especially suitable for refractory applications.

In some embodiments, instead of or in addition to the AZS and tabular alumina, the solid particles 135 can comprise alumina trihydrate, also known as ATH. In some embodiments, the ATH can comprise alumina trihydrate powder. Like the AZS and tabular alumina, the ATH can be added in varying amounts, and thus several ratios of AZS to ATH to tabular alumina are envisioned. In some embodiments, for example, between 35% and 55% by weight of the solid particles 135 can be AZS, between 35% and 55% of the solid particles 135 can be ATH, and between 5% and 20% can be tabular alumina. In some embodiments, between 43% and 46% of the solid particles 135 can be AZS, between 43% and 46% of the solid particles 135 can be ATH, and between 9% and 13% can be tabular alumina. Thus, in some embodiments, the ratio of AZS particles 135 to ATH particles 135 to other particles 135 (such as tabular alumina particles 135), by weight, can be 4:4:1 or approximately 4:4:1. In some embodiments, however this ratio can be from 3:3:1 to 5:5:1, such as, for example and not limitation, 3:4:1, 3:5:1, 4:3:1, 4:4:1, 4:5:1, 5:3:1, 5:4:1. Thus, in some embodiments, AZS and ATH particles 135 can be present in substantially the same amount, by weight, and tabular alumina particles 135 can be present in a smaller amount.

While the chemical make-up of the mixture of particles 135 can vary, an example is provided in Table 4 below for an AZS and tabular alumina mixture. The percentages shown in Table 4 are weight percentages based upon the total weight of the mixture of particles 135.

TABLE 4

| Particle Composition | |
|---|---|
| $Al_2O_3$ | 42.0-53.0% |
| $ZrO_2$ | 29.0-36.5% |
| CaO | 0.0-0.4% |
| $SiO_2$ | 9.5-16.0% |
| $HfO_2$ | 0.00-0.65% |
| $Na_2O$ | 1.0-2.5% |
| $H_2O$ | 1.0-3.0% |

The chemical make-up of the mixture of particles 135, however, is not limited by the values in Table 4. Rather, Table 4 shows an exemplary composition. In some embodiments, for example, $Al_2O_3$ can be present in an amount ranging from 20% to 80%, $ZrO_2$ can be present in an amount ranging from 10% to 50%, CaO can be present in an amount ranging from 0% to 5%, and $SiO_2$ can be present in an amount ranging from 3% to 25%. In some embodiments, $HfO_2$ can be present in an amount ranging from 0% to 5%, $Na_2O$ can be present in an amount ranging from 0.1% to 15%, and $H_2O$ can be present in an amount ranging from 0.1% to 15%.

In some embodiments, other components can be present in the mixture of particles 135, and/or some of the components listed in Table 4 can be absent. In other words, the chemical make-up of the mixture is variable both by the components included and the amount of each component, and is not limited by the example shown in Table 4.

Having a plurality of types of particles 135, such as AZS particles 135, ATH particles 135, and tabular alumina particles 135, can improve the surface structure by introducing a desirable size distribution of particles 135 and desirable spacing of particles 135 that, in combination with the properties of the particles 135, produces high clean-ability and high slip resistance. Moreover, in some embodiments, these materials can interact with the base formula 130 in a manner that provides a desired amount of dissolution to form the peaks 120, valleys 125, and spacing so that the surface coating 115 is both highly cleanable and slip resistant.

In some embodiments, the size of the particles 135 and size distribution of the particles 135 can play a role in the clean-ability and slip resistance of the final tile 100. An exemplary particle size distribution is shown in Table 5. Table 5 was generated by a particle size analysis machine, and, specifically, by a dynamic light scattering technique. In Table 5, the channel diameter is the diameter through which a corresponding percentage of the particles 135 are able to pass through. It can also be looked at as if the particles are being filtered out when they cannot pass through a channel diameter of a certain size.

TABLE 5

| % Less Than | Channel Diameter (Lower) μm |
|---|---|
| 0.18 | 0.3752 |
| 10 | 1.01492 |
| 25 | 2.33999 |
| 50 | 7.25089 |
| 75 | 14.167 |
| 90 | 20.0436 |
| 100 | 33.011 |

Figure 4:
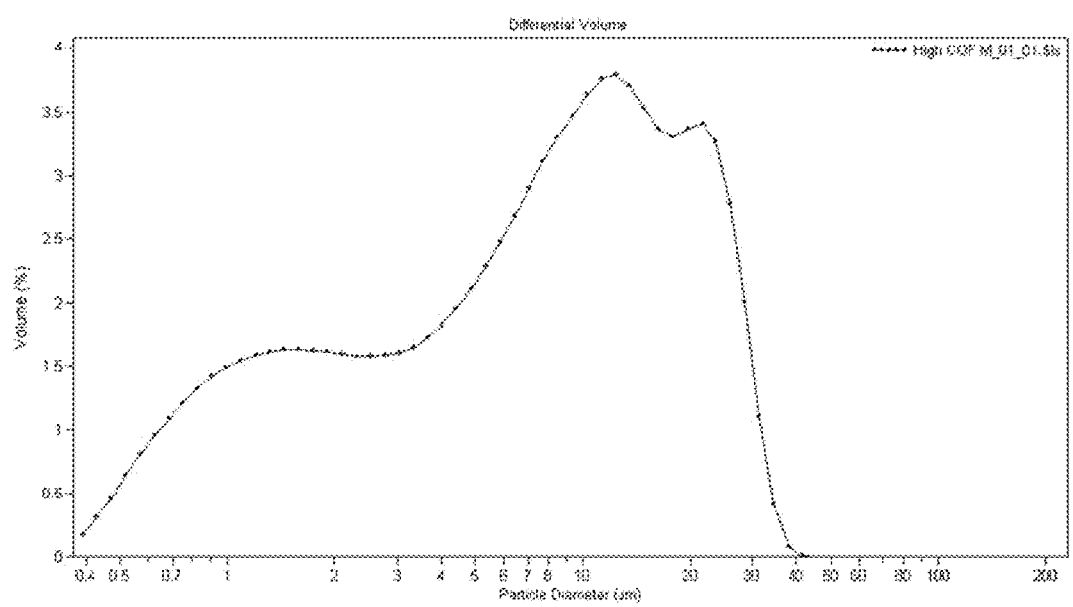
FIG. 4 is a graph showing size distribution of particles in a surface coating, in accordance with some embodiments of this disclosure.

In addition, in some embodiments, the particle size distribution of the solid particles can be the same as or similar to that shown in FIG. 4. Table 5 and FIG. 4 are both examples, and do not limit the sizes or size distributions of particles 135. For example, as shown in Table 5, substantially all of the particles 135 have a channel diameter smaller than 33.011 μm, but this is not meant to limit the size distributions contemplated by this disclosure.

Both Table 5 and FIG. 4 show that there can be a relatively high percentage of larger particles 135. These larger particles 135 can help improve the slip resistance of the final product by providing higher and better defined peaks 120 and lower and better defined valleys 125. Moreover, the interplay between the make-up of the base formula 130 and the larger particles 135 can space the particles 135 such that they provide the smooth transitions between peaks 120 and valleys 125 that can provide high clean-ability.

In some embodiments, the solid particles can make up from 2% to 10% of the weight of the surface coating 115. In some embodiments, the solid particles can make up from 7% to 15% of the weight of the surface coating 115. In some embodiments, the solid particles can make up from 1% to 25% of the weight of the surface coating 115.

After the surface coating 115 is completed, it can be sprayed onto a substrate, such as a raw tile or wood floor-board. In some embodiments, such as embodiments involving a tile 100, the tile 100 can have an optional base coating 110, such as a ceramic coating. In some embodiments, the base coating 110 can have a high enough molten viscosity to keep the particles 135 in the surface coating 115 suspended on top of the base coating 110 throughout manufacturing and until a finished tile 100 is formed. In tile applications, the base coating 110 can have a high enough molten viscosity to keep the particles 135 suspended on top of the base coating 100 during firing. In some embodiments, the minimum viscosity that can support particles 135 throughout firing is in the area of $e^5$ or $2.71828^5$ Pa*s. This value is not limiting, however, as higher or lower viscosities can be required or acceptable. One important factor, though, is that the base coating maintains a sufficient viscosity at peak firing temperature in order to support the particles 135 in the surface coating 115.

In addition to the advantages described above, tiles 100 and coatings in accordance with this disclosure can be fired across a range of temperatures. Specifically, the surface coatings 115 of the present disclosure, such as those described above, can be fired above 1150 degrees Celsius. It is desirable to fire surface coatings 115 at these higher temperatures because the higher temperatures yield a stronger, more resilient coating. However, traditional surface coatings cannot be fired at these high temperatures because suspended particles would melt and the desired surface characteristics would not be achieved. The inventors of the present disclosure have found, however, that firing the surface coatings 115 described above at higher than 1150 degrees Celsius does not melt the particles 135 due to unique interactions between the base formula 130 and particles 135. In fact, the surface coating 115 can be fired at a temperature as high as 1250 degrees Celsius without melting the particles 135. Thus, the surface coatings 115 of the present disclosure can provide a stronger, more resilient coating without sacrificing the desired surface characteristics of high clean-ability and high slip resistance.

In some embodiments, a tile 100 in accordance with the present disclosure can be coated with a surface coating 115 and fired in two stages—a low firing and a high firing. In some embodiments, the low firing can be approximately 25 minutes at about 1150 degrees Celsius. After the low firing, the high firing can take place for approximately 60 minutes at about 1230 degrees Celsius. In some embodiments, however, the low firing can be for between 10 and 40 minutes at between 1000 and 1170 degrees Celsius, and the high firing can be for between 30 and 90 minutes at between 1150 and 1300 degrees Celsius. These conditions can produce a finished tile 100 with high clean-ability and high slip resistance in accordance with this disclosure.

Figure 5:
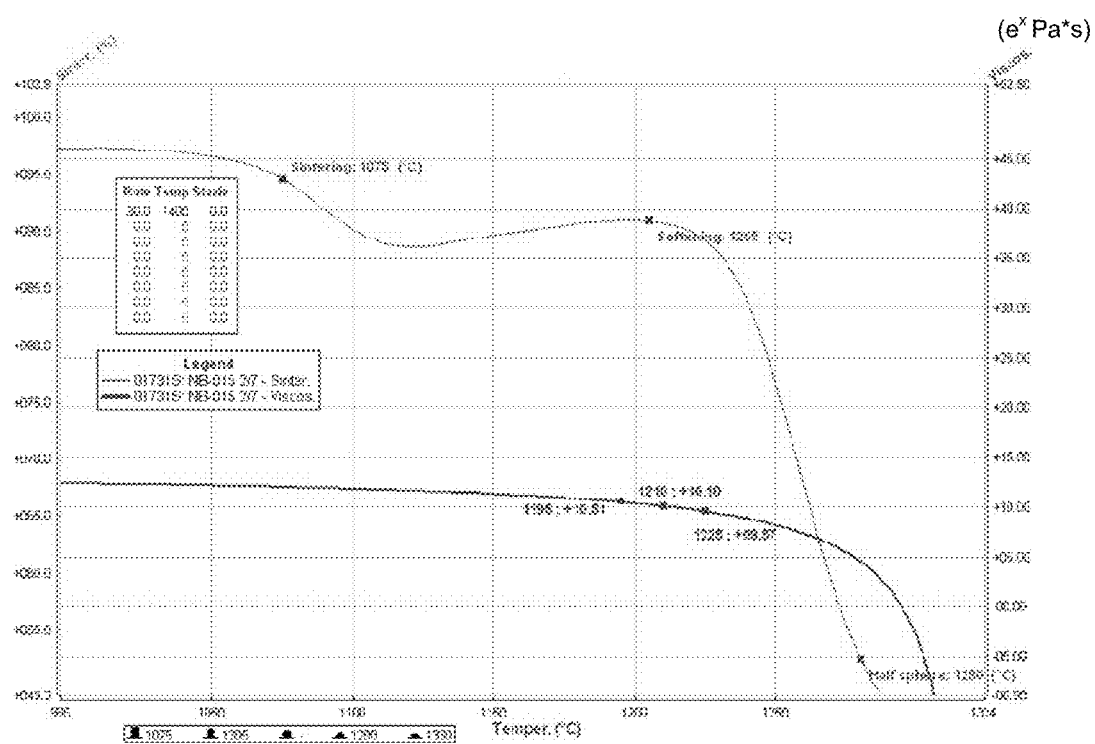
FIG. 5 is a graph showing sintering properties and viscosity properties of a desirable base coating over a range of firing temperatures, in accordance with some embodiments of this disclosure.
Figure 6:
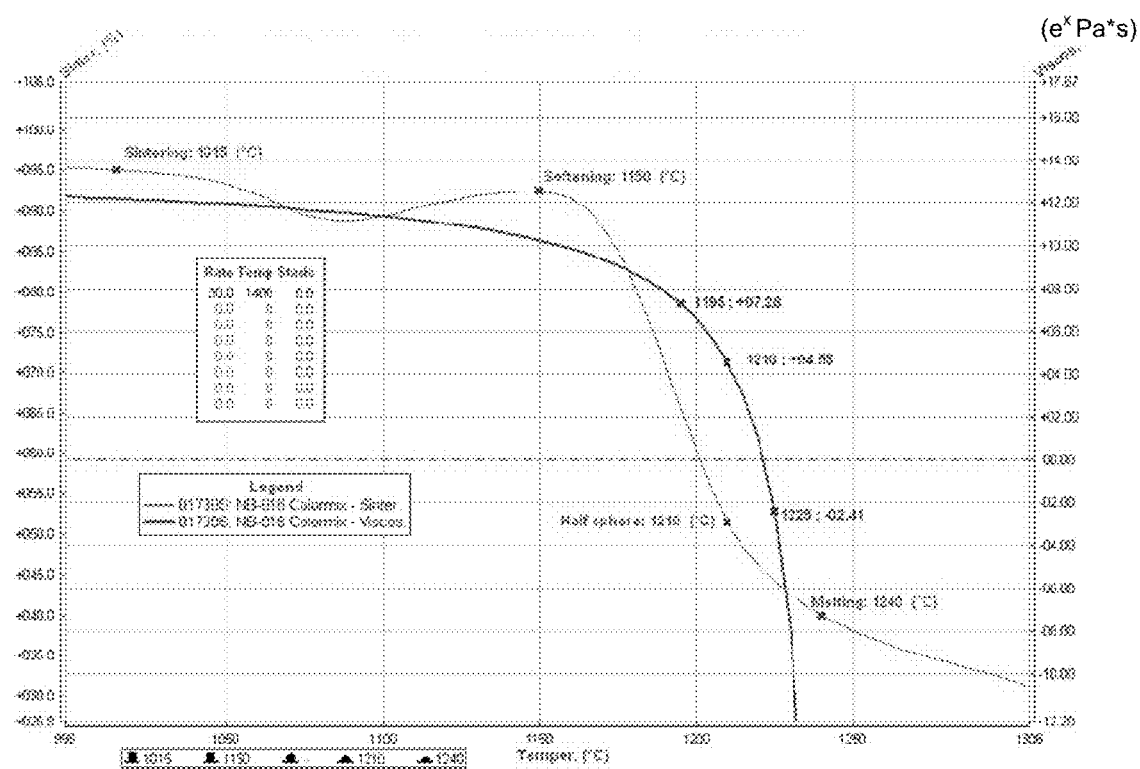
FIG. 6 is a graph showing sintering properties and viscosity properties of an undesirable base coating over a range of firing temperatures.
Figure 7:
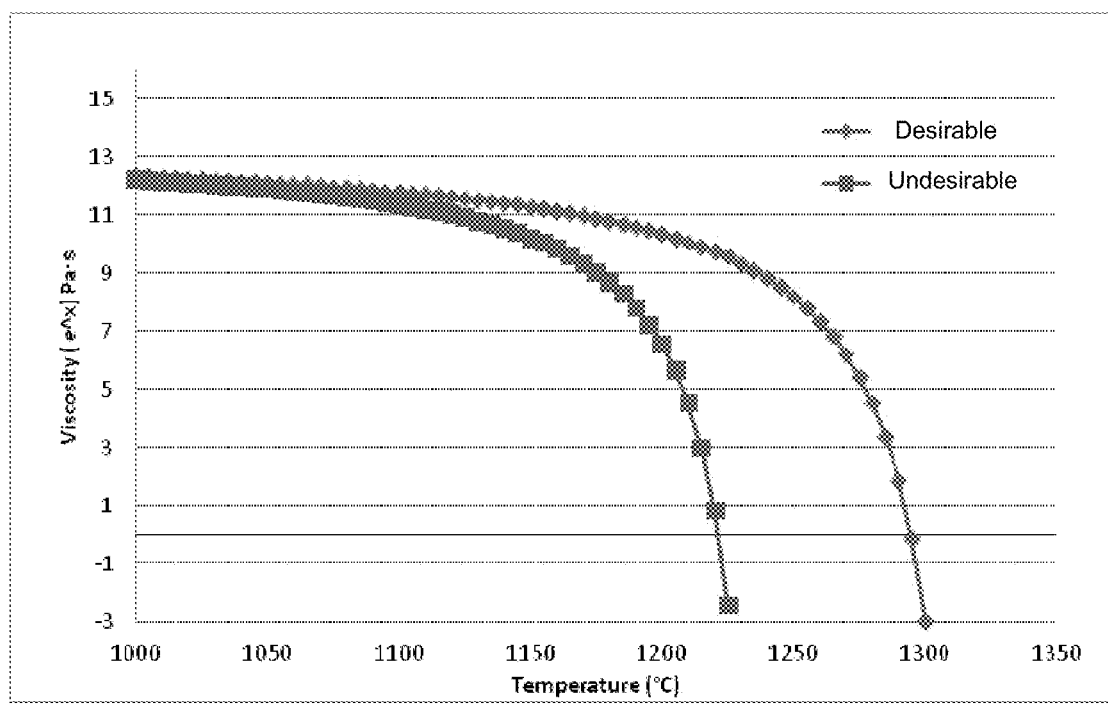
FIG. 7 is a graph showing a comparison of viscosity properties of a desirable base coating and an undesirable base coating.

FIG. 5 and FIG. 6 illustrate the properties of a desirable base coating 110 and an undesirable base coating 110. FIG. 5 shows the sintering properties and viscosity properties of a desirable base coating 110 over a range of firing temperatures. As one of skill in the art will understand, the base coating 110 of FIG. 5 maintains a sufficiently high viscosity of about $e^5$ to and above 1275-1300 degrees Celsius. Thus, as shown, the particles of the base coating 110 can sinter and the viscosity can remain high at high temperatures. As shown in FIG. 6, an undesirable base coating 110 does not maintain a sufficiently high viscosity at it approaches 1250 degrees Celsius or 1300 degrees Celsius. FIG. 7 shows a comparison of viscosities for a desirable base coating 110 and an undesirable base coating 110. Again, the desirable base coating 110 maintains a sufficiently high viscosity to and above 1275 degrees Celsius, whereas the undesirable base coating 110 does not. Those of skill in the art will understand that a tile 100 can be made with an undesirable base coating 110, but the results will generally not be as advantageous as with a desirable base coating 110.

Embodiments of the present disclosure can comprise a method for manufacturing flooring, such as one or more tiles 100. In some embodiments, a piece of flooring is made using pressed or molded material to form a substrate 105, and the flooring is optionally coated with one or more layers of base coating 110. A surface coating 115 in accordance with the present disclosure is then added on top of the base coating 110, if present, or on top of the substrate 105, if there is no base coating 110. The flooring can then be fired.

In some embodiments, the surface coating 115 can be applied to a tile 100 by a spray gun or spray booth. In another instance, the surface coating 115 can be applied by cascading the surface coating 115 onto the flooring. In another instance, the surface coating 115 can be applied by a controlled splattering of the surface coating 115, which can be done by a double disc applicator known within the ceramics industry.

In some embodiments, after applying the surface coating and firing, the flooring will be ready for processing and then packaging.

While certain systems and methods related to composite tile systems and methods have been disclosed in some exemplary forms, many modifications, additions, and deletions may be made without departing from the spirit and scope of the system, method, and their equivalents. The embodiments disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other devices, methods, and systems for carrying out the several purposes of the embodiments and claims presented herein. It is important, therefore, that the claims be regarded as including such equivalent constructions.

What is claimed is:

1. A tile comprising:
 a ceramic substrate; and
 a surface coating comprising:
  a base formula; and
  particles comprising alumina-zirconium-silicate,
 wherein the base formula comprises a glaze.

2. The tile of claim 1, the surface coating further comprising particles comprising tabular alumina.

3. The tile of claim 1, the surface coating further comprising particles comprising alumina trihydrate.

4. The tile of claim 1, the surface coating further comprising particles comprising tabular alumina and particles comprising alumina trihydrate.

5. The tile of claim 4, wherein the weight of particles comprising alumina-zirconium-silicate and the weight of particles comprising alumina trihydrate is substantially equal.

6. The tile of claim 4, wherein the weight ratio of particles comprising alumina-zirconium-silicate to particles comprising alumina trihydrate to particles comprising tabular alumina is from 3:3:1 to 5:5:1.

7. The tile of claim 4, wherein the weight ratio of particles comprising alumina-zirconium-silicate to particles comprising alumina trihydrate to particles comprising tabular alumina is approximately 4:4:1.

8. The tile of claim 1, wherein substantially all of the particles have a diameter less than 33.011 µm.

9. The tile of claim 1, wherein about 90% of the particles have a diameter less than 20.0436 µm.

10. The tile of claim 1, wherein about 50% of the particles have a diameter less than 7.25089 µm.

11. The tile of claim 1, further comprising a base coating disposed substantially between the substrate and the surface coating.

12. The tile of claim 11, wherein the base coating supports the surface coating during a firing process, wherein at least a portion of the firing process occurs at above 1150 degrees Celsius.

13. The tile of claim 1, the surface coating providing a clean-ability $\Delta E$ of 0.6 to 1.0 and a dynamic coefficient of friction of 0.60 to 0.95.

14. The tile of claim 1, wherein the glaze comprises a frit, a clay, and an opacifier.

15. The tile of claim 13, wherein an average RMS of the tile is between 11.5 µm and 12.6 µm.

16. The tile of claim 13, wherein an average Ra of the tile is between 9.5 µm and 11.0 µm.

17. The tile of claim 1, wherein the particles make up 1% to 25% of the weight of the surface coating.

* * * * *